US008648940B2

(12) United States Patent
Ogawa

(10) Patent No.: US 8,648,940 B2
(45) Date of Patent: Feb. 11, 2014

(54) IMAGE PROCESSING APPARATUS AND IMAGE PROCESSING METHOD OF INTERPOLATING DEFECTIVE PIXEL OF IMAGE PICKUP ELEMENT TO PERFORM IMAGE PROCESSING

(75) Inventor: Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 13/315,987

(22) Filed: Dec. 9, 2011

(65) Prior Publication Data
US 2012/0162488 A1 Jun. 28, 2012

(30) Foreign Application Priority Data

Dec. 22, 2010 (JP) ................................ 2010-285347

(51) Int. Cl.
*H04N 5/217* (2011.01)
(52) U.S. Cl.
USPC ........................... 348/246; 348/241; 348/247
(58) Field of Classification Search
USPC ......................................... 348/246, 241, 247
See application file for complete search history.

(56) References Cited

U.S. PATENT DOCUMENTS

| 4,410,804 A * | 10/1983 | Stauffer ..................... 250/208.2 |
| 2005/0030395 A1 * | 2/2005 | Hattori ........................... 348/246 |
| 2005/0219390 A1 * | 10/2005 | Tajima et al. ................. 348/246 |
| 2007/0236598 A1 * | 10/2007 | Kusaka .......................... 348/350 |
| 2007/0237511 A1 * | 10/2007 | Kusaka .......................... 396/111 |
| 2009/0096903 A1 * | 4/2009 | Kusaka .......................... 348/302 |
| 2009/0207264 A1 * | 8/2009 | Utsugi ....................... 348/222.1 |
| 2010/0188522 A1 * | 7/2010 | Ohnishi et al. ............. 348/222.1 |
| 2010/0245631 A1 * | 9/2010 | Hoda et al. .................... 348/241 |
| 2011/0169997 A1 * | 7/2011 | Nagano et al. ................ 348/340 |
| 2011/0228145 A1 * | 9/2011 | Kimura ......................... 348/247 |
| 2012/0212654 A1 * | 8/2012 | Nagata ......................... 348/247 |
| 2013/0235276 A1 * | 9/2013 | Ogawa ......................... 348/703 |

FOREIGN PATENT DOCUMENTS

| JP | 2001-083407 | 3/2001 |
| JP | 2009-163229 | 7/2009 |

\* cited by examiner

*Primary Examiner* — Nicholas Giles
*Assistant Examiner* — Abdelaaziz Tissire
(74) *Attorney, Agent, or Firm* — Cowan, Liebowitz & Latman, P.C.

(57) ABSTRACT

An image processing apparatus includes a first defect interpolation unit that interpolates a defective pixel using a pixel value of a first pixel near a specific first pixel or a pixel value of a second pixel near a specific second pixel, a second defect interpolation unit that interpolates the defective pixel using a rate of pixel values of a first pixel and a second pixel in the same micro lens near the specific first pixel and the specific second pixel, an in-focus level evaluation unit that evaluates an in-focus level using outputs of the first and second pixels, a synthesis rate switching unit that switches a synthesis rate of outputs of the first and second defect interpolation units, and a signal processing unit that generates a shot image using an output of the synthesis rate switching unit.

6 Claims, 13 Drawing Sheets

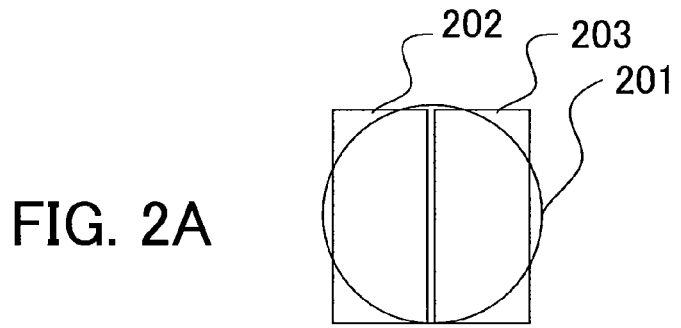
FIG. 2A
FIG. 2B
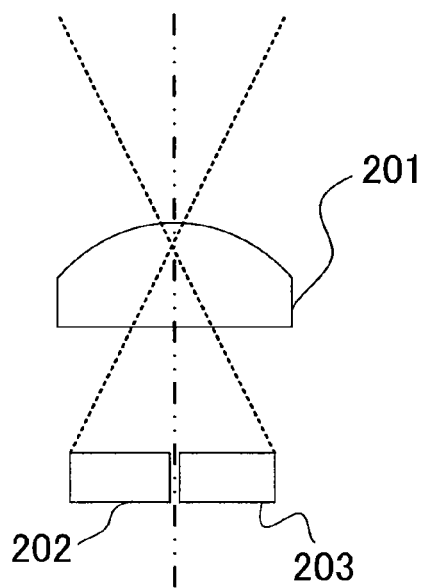
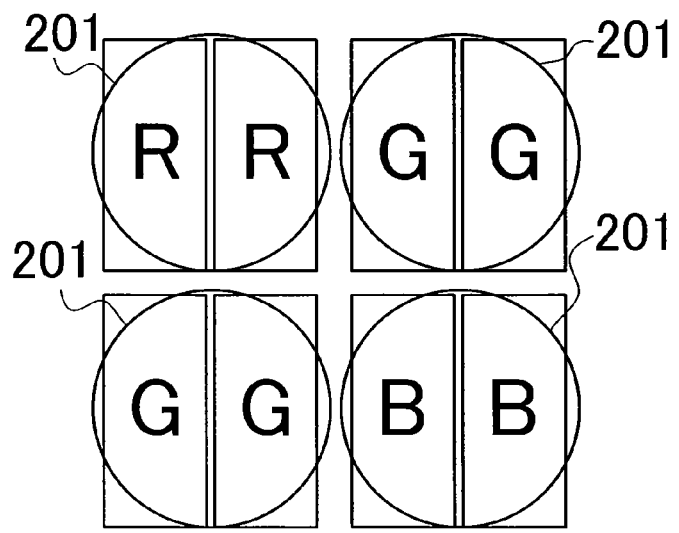
FIG. 3

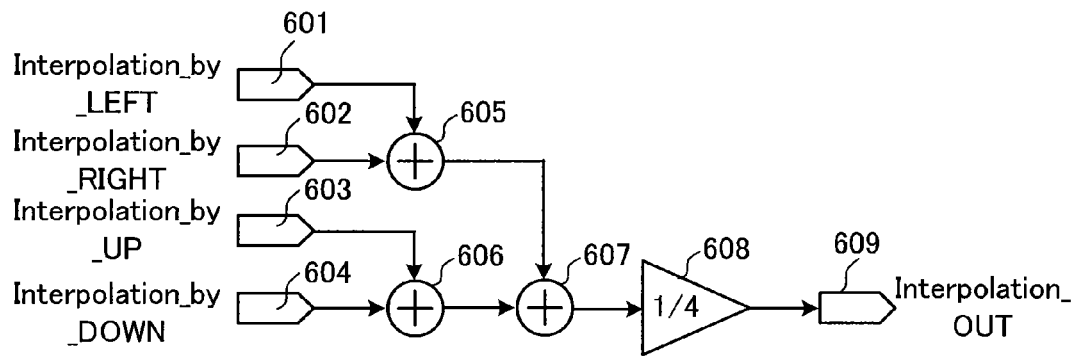
FIG. 6
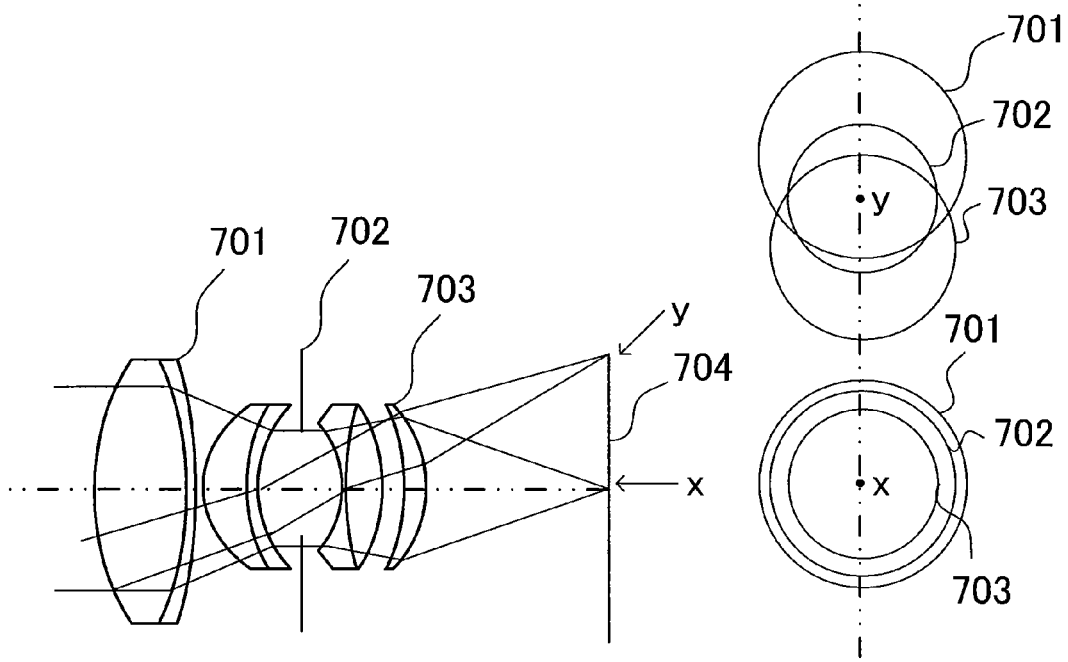
FIG. 7A
FIG. 7B

IMAGE PROCESSING APPARATUS AND IMAGE PROCESSING METHOD OF INTERPOLATING DEFECTIVE PIXEL OF IMAGE PICKUP ELEMENT TO PERFORM IMAGE PROCESSING

BACKGROUND OF THE INVENTION

1. Field of the Invention

The present invention relates to an image processing apparatus that interpolates a defective pixel of an image pickup element to perform an image processing.

2. Description of the Related Art

There is an image processing apparatus that arranges a plurality of photo diodes for one micro lens of an image pickup element to perform a pupil division and that calculates a defocus amount based on a phase difference to perform focus detection. Japanese Patent Laid-Open No. 2001-083407 discloses a technology that calculates a defocus amount and a defocus direction based on a shift amount and a direction of a projected position of an object that is projected on each of pixel arrays that are obtained by the pupil division to perform the focus detection in such a configuration. Japanese Patent Laid-Open No. 2001-083407 discloses a configuration in which signals of photo diodes that correspond to the same micro lens are added to obtain a common video signal.

Japanese Patent Laid-Open No. 2009-163229 discloses a technology that is related to an interpolating method when a defect exists in pixels that are obtained by the pupil division. Japanese Patent Laid-Open No. 2009-163229 discloses a configuration in which a pixel obtained by the pupil division is discretely arranged between normal pixels to obtain a focus detection signal and a video signal. In a video signal processing, the pixel obtained by the pupil division is treated as a defective pixel and a defective pixel interpolation is performed by using information of a nearby normal pixel. On the other hand, with respect to the pixel obtained by the pupil division that is discretely arranged, the defective pixel interpolation is performed by using information of the pixel obtained by the nearby pupil division when the defect exists.

However, in the technology that is disclosed in Japanese Patent Laid-Open No. 2009-163229, a spatial distance to the nearby pixel obtained by the pupil division that is used for interpolating the defect of the pixel obtained by the pupil division is long. Therefore, when the sharpness of the image is high, an interpolation error is large. On the other hand, Japanese Patent Laid-Open No. 2001-083407 does not disclose a method of interpolating the defective pixel.

SUMMARY OF THE INVENTION

The present invention provides an image processing apparatus and an image processing method that are capable of interpolating a defective pixel appropriately even when a sharpness is high during processing of an image pickup signal that is obtained by performing a pupil division.

An image processing apparatus as one aspect of the present invention performs a pupil division of a light beam from an image pickup optical system to obtain a first light beam and a second light beam, and processes an image that is obtained by using an image pickup element that includes a plurality of first pixels that perform a photoelectric conversion of the first light beam and a plurality of second pixels that perform a photoelectric conversion of the second light beam. The image processing apparatus includes a first defect interpolation unit configured to interpolate a defective pixel using a pixel value of a first pixel near a specific first pixel when the specific first pixel is the defective pixel or using a pixel value of a second pixel near a specific second pixel when the specific second pixel is the defective pixel, a second defect interpolation unit configured to interpolate the defective pixel using a rate of pixel values of a first pixel and a second pixel in the same micro lens near the specific first pixel and the specific second pixel, an in-focus level evaluation unit configured to evaluate an in-focus level using outputs of the plurality of first pixels and the plurality of second pixels, a synthesis rate switching unit configured to switch a synthesis rate of an output of the first defect interpolation unit and an output of the second defect interpolation unit so that the rate of the output of the second defect interpolation unit increases as the in-focus level that is evaluated by the in-focus level evaluation unit is heightened and the rate of the output of the first defect interpolation unit increases as the in-focus level is lowered, and a signal processing unit configured to generate a shot image using an output of the synthesis rate switching unit.

An image processing method as another aspect of the present invention performs a pupil division of a light beam from an image pickup optical system to obtain a first light beam and a second light beam, and processes an image that is obtained by using an image pickup element that includes a plurality of first pixels that perform a photoelectric conversion of the first light beam and a plurality of second pixels that perform a photoelectric conversion of the second light beam. The image processing method includes a first defect interpolation step that interpolates a defective pixel using a pixel value of a first pixel near a specific first pixel when the specific first pixel is the defective pixel or using a pixel value of a second pixel near a specific second pixel when the specific second pixel is the defective pixel, an in-focus level evaluation step that evaluates an in-focus level using outputs of the plurality of first pixels and the plurality of second pixels, a second defect interpolation step that interpolates the defective pixel using a rate of pixel values of a first pixel and a second pixel in the same micro lens near the specific first pixel and the specific second pixel, a synthesis rate switching step that switches a synthesis rate of an output in the first defect interpolation step and an output of the second defect interpolation step so that the rate of the output of the second defect interpolation step increases as the in-focus level that is evaluated by the in-focus level evaluation step is heightened and the rate of the output of the first defect interpolation step increases as the in-focus level is lowered, and a signal processing step that generates a shot image using an output that is obtained by the synthesis rate switching step.

Further features and aspects of the present invention will become apparent from the following description of exemplary embodiments with reference to the attached drawings.

BRIEF DESCRIPTION OF THE DRAWINGS

FIGS. 2A and 2B are diagrams of illustrating a pixel structure of an image pickup element in Embodiment 1.

FIG. 3 is a diagram of illustrating a pixel array of the image pickup element in Embodiment 1.

FIG. 6 is a block diagram of an averaging circuit in Embodiment 1.

FIGS. 7A and 7B are diagrams of describing a shading principle in Embodiment 1.

DESCRIPTION OF THE PREFERRED EMBODIMENTS

Figure 1:
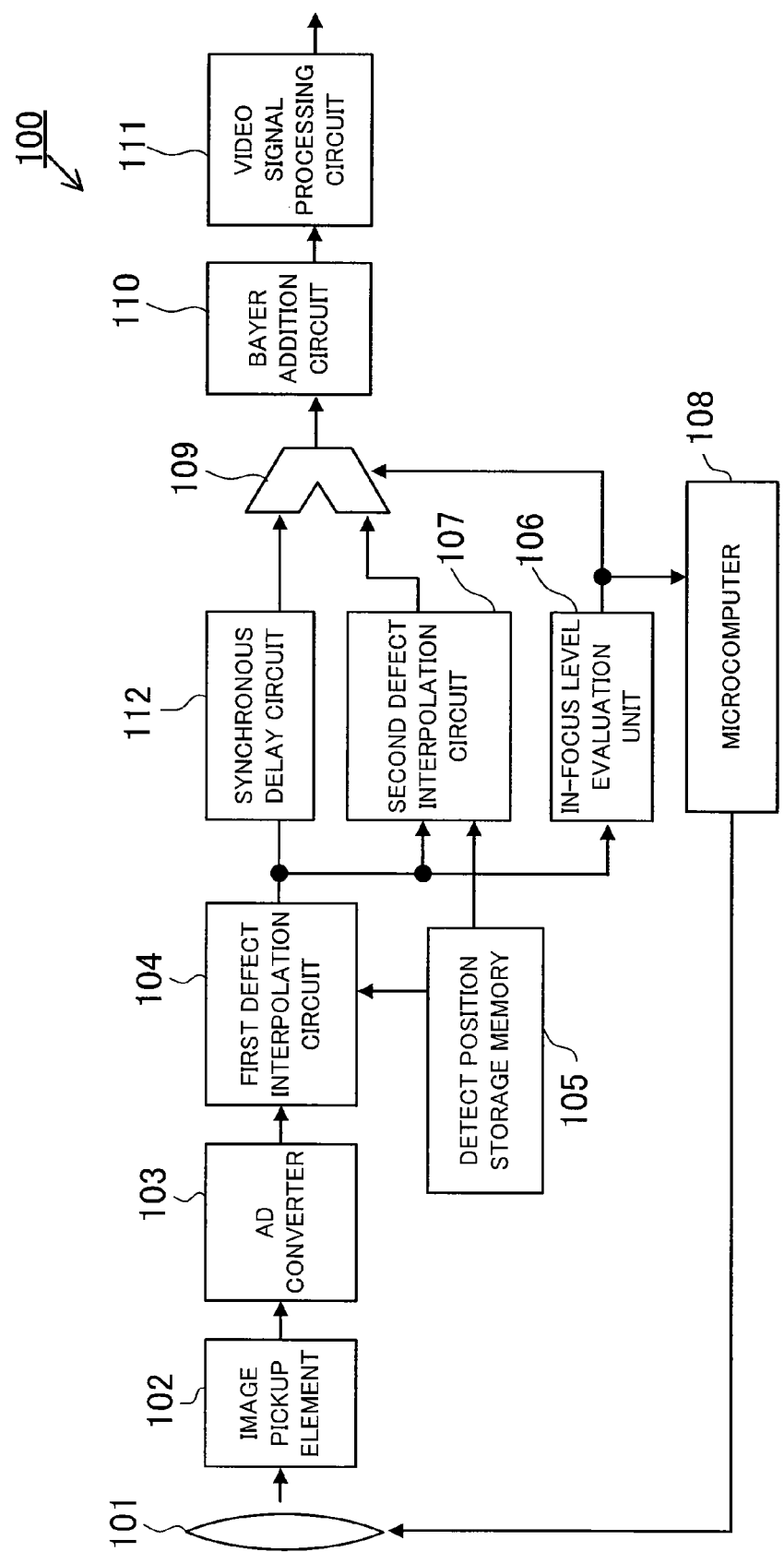
FIG. 1 is a block diagram of an image processing apparatus in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, Embodiment 1 of the present invention will be described. FIG. 1 is a block diagram of an image processing apparatus 100 in the present embodiment. The image processing apparatus 100 performs a pupil division of a light beam from an image pickup optical system (a lens 101) to obtain a first light beam and a second light beam, and processes an image that is obtained by using an image pickup element 102 that includes a plurality of first pixels that perform a photoelectric conversion of the first light beam and a plurality of second pixels that perform a photoelectric conversion of the second light beam.

In FIG. 1, reference numeral 101 denotes a lens, reference numeral 102 denotes an image pickup element, and reference numeral 103 denotes an AD converter that converts a signal of the image pickup element 102 into a digital signal. Reference numeral 104 denotes a first defect interpolation circuit (a first defect interpolation unit) and reference numeral 105 denotes a defect position storage memory that stores a defect position. Reference numeral 106 denotes an in-focus level evaluation unit, which evaluates an in-focus level using a phase difference of the first light beam and the second light beam that are obtained by performing a pupil division. Reference numeral 107 denotes a second defect interpolation circuit (a second defect interpolation unit), reference numeral 108 denotes a microcomputer, and reference numeral 112 denotes a synchronous delay circuit that matches timings of an output of the first defect interpolation circuit 104 and an output of the second defect interpolation circuit 107. Reference numeral 109 denotes a mixing circuit (a synthesis rate switching unit) that mixes the output of the synchronous delay circuit 112 and the output of the second defect interpolation circuit 107. Reference numeral 110 denotes a Bayer addition circuit that adds an output of the mixing circuit 109 to be converted into a Bayer array signal. Reference numeral 111 denotes a video signal processing circuit (a signal processor) that generates a video signal such as a color difference or brightness based on the Bayer array signal that is an output of the Bayer addition circuit 110. The video signal processing circuit 111 generates a shot image using the output of the mixing circuit 109.

An image that is formed on the image pickup element 102 via the lens 101 is read out as an analog signal, and is converted into a digital signal by the AD converter 103. An output of the AD converter 103 is interpolated by the first defect interpolation circuit 104. The first defect interpolation circuit 104 performs an interpolation processing for a pixel of a defect position (a defective pixel) that is stored in the defect position storage memory 105. A signal that is obtained by the interpolation processing of the first defect interpolation circuit 104 is inputted into the synchronous delay circuit 112, the second defect interpolation circuit 107, and the in-focus level evaluation unit 106. The second defect interpolation circuit 107 also performs an interpolation for the pixel at the defect position that is stored in the defect position storage memory 105. The details of the first defect interpolation circuit 104 and the second defect interpolation circuit 107 will be described below.

The output of the first defect interpolation circuit 104 is also inputted into the in-focus level evaluation unit 106 to be used for the calculation of the in-focus level. The synchronous delay circuit 112 matches the timings (the output timings) of the output of the first defect interpolation circuit 104 and the output of the second defect interpolation circuit 107. The mixing circuit 109 mixes the output of the synchronous delay circuit 112 with the output of the second defect interpolation circuit 107. A mix rate at this time is controlled by the in-focus level that is an input from the in-focus level evaluation unit 106. The mixing circuit 109 mixes the result of the first defect interpolation circuit 104 (the output of the synchronous delay circuit 112) with the result of the second defect interpolation circuit 107 to output the mixed signal to the Bayer addition circuit 110. The Bayer addition circuit 110 outputs a common Bayer array signal that is obtained by adding the A pixel and the B pixel to the video signal processing circuit 111. The video signal processing circuit 111 processes the Bayer array signal to generate a video signal.

Subsequently, referring to FIGS. 2A and 2B, a pixel structure of the image pickup element 102 will be described. FIG. 2A illustrates a front view of pixels of the image pickup element 102, and FIG. 2B illustrates a cross-sectional view of the pixels. In FIGS. 2A and 2B, reference numeral 201 denotes a micro lens, and each of reference numerals 202 and 203 denotes a photo diode. An image is read out by using the two photo diodes for one micro lens to perform a pupil division to the right and left in FIGS. 2A and 2B. Hereinafter, the pixels of the right and left are referred to as an A pixel (a first pixel) and a B pixel (a second pixel) respectively, and images that are formed by collecting the right pixels and the left pixels (the A pixels and the B pixels) are referred to as an A image and a B image respectively. FIG. 3 is a diagram of illustrating a pixel array (an array of color filters) of the image pickup element 102 in the present embodiment. As illustrated in FIG. 3, the array of the color filters is added by each micro lens 201 to be a common Bayer array.

As illustrated in FIG. 1, the output signal from the image pickup element 102 is converted into the digital signal by the AD converter 103 to be inputted to the first defect interpolation circuit 104. A signal that indicates the defect position is outputted from the defect position storage memory 105 to the first defect interpolation circuit 104 in synchronization with an image. The defect position storage memory 105 is configured by a one-time ROM or a flash ROM, and stores the defect position of the pixel that has been detected in a manufacturing process.

Figure 5:
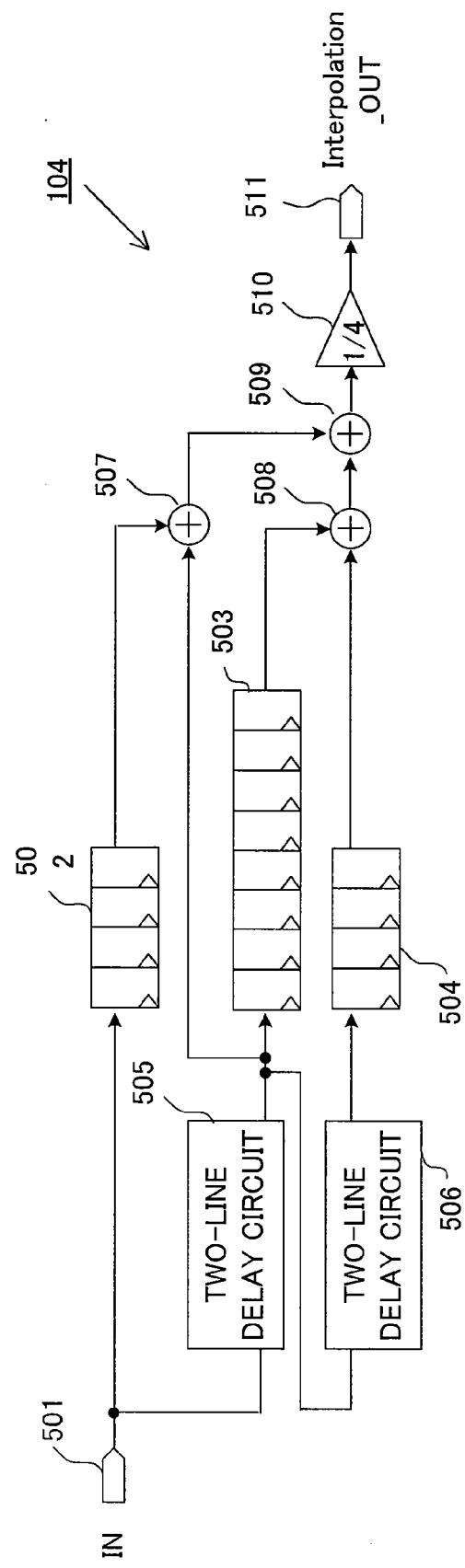
FIG. 5 is a circuit diagram of a first defect interpolation circuit in Embodiment 1.

Subsequently, referring to FIG. 5, a circuit configuration of the first defect interpolation circuit 104 will be described. FIG. 5 is a circuit diagram of the first defect interpolation circuit 104. In FIG. 5, reference numeral 501 denotes a terminal that inputs a signal, and reference numerals 505 and 506 are two-line delay circuits. The signal inputted from the terminal 501 is delayed by the two-line delay circuits 505 and 506. This configuration can match the input signal at the terminal 501 and the timings of the outputs of the two-line delay circuits 505 and 506 between upper and lower lines. Each of the signals that are delayed by delay elements 502, 503, and 504 is a signal of the same color pixel that is obtained by the pupil division and that has the same opening on the left, right, top, and bottom.

Figure 10:
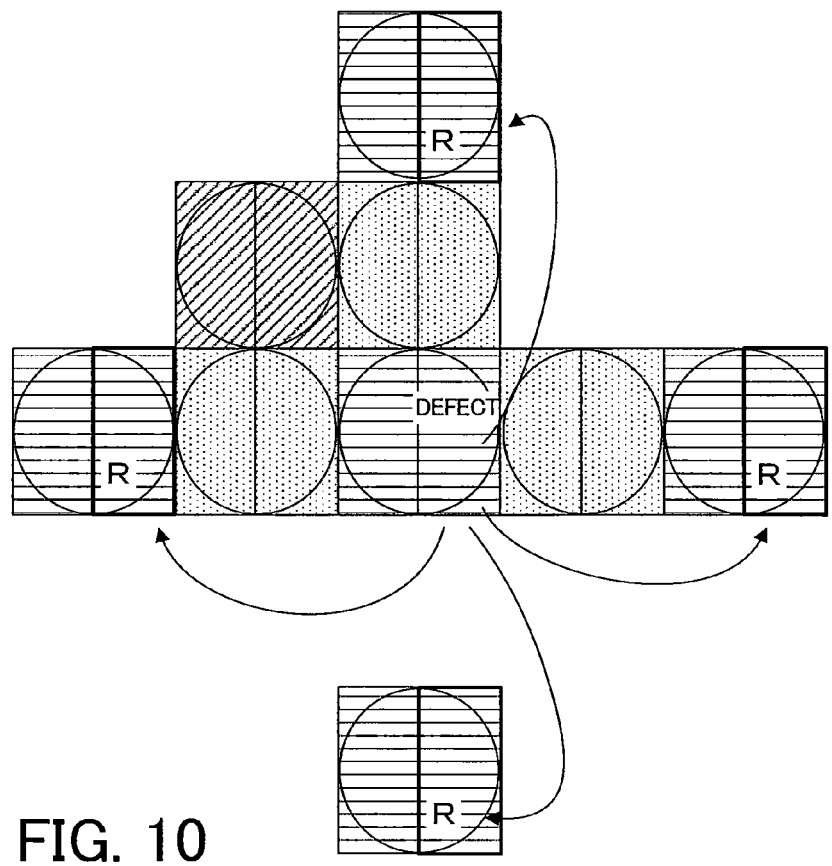
FIG. 10 is a diagram of relationship between a defective pixel and a reference pixel by the first defect interpolation circuit in Embodiment 1.

Next, referring to FIG. 10, a position relation of the pixels will be described. FIG. 10 is a diagram of illustrating reference pixels that are used by the first defect interpolation circuit 104. In FIG. 10, when a defective pixel is assumed to be the right side pixel (a specific second pixel) of the center micro lens, signals of the right side pixels (nearby second pixels, i.e. second pixels near the specific second pixel) that has the same color at the left, right, top, and bottom of the defective pixel are outputs of the delay elements 502, 503, 504, and the two-line delay circuit 505, respectively. These output values are added by adder circuits 507, 508, and 509 and the added value are reduced to be one-fourth of the value by a shift circuit 510, and an average value of the outputs are outputted to a terminal 511. Thus, the first defect interpolation circuit 104 refers to the pixel values at the side of the same adjacent aperture pupil to correct the defective pixel. In other words, when the specific second pixel is the defective pixel, the first defect interpolation circuit 104 interpolates the defective pixel using the pixel value of the second pixel near the specific second pixel. If a specific first pixel (a left side pixel of the center micro lens) is the defective pixel, the defective pixel is interpolated by using pixel values of nearby first pixels, i.e. first pixels near the specific first pixel (left side pixels that have the same color at the left, right, top, and bottom of the defective pixel).

Figure 12A:
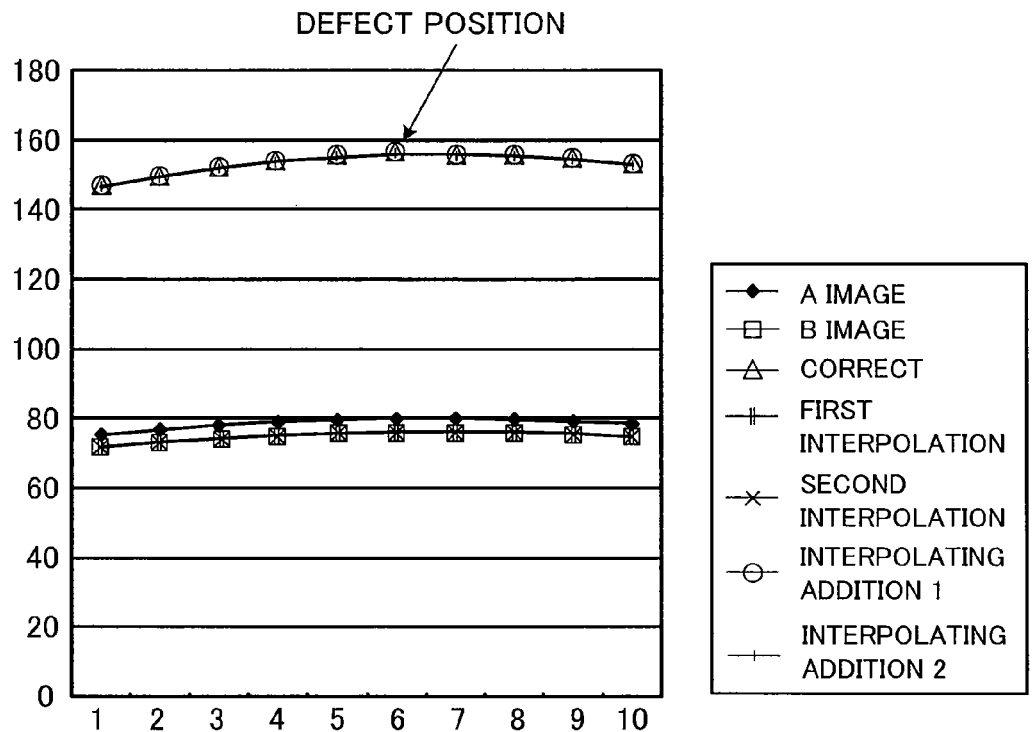
FIGS. 12A and 12B are diagrams of a relationship between a defective pixel interpolation and a spatial frequency in Embodiment 1.
Figure 12B:
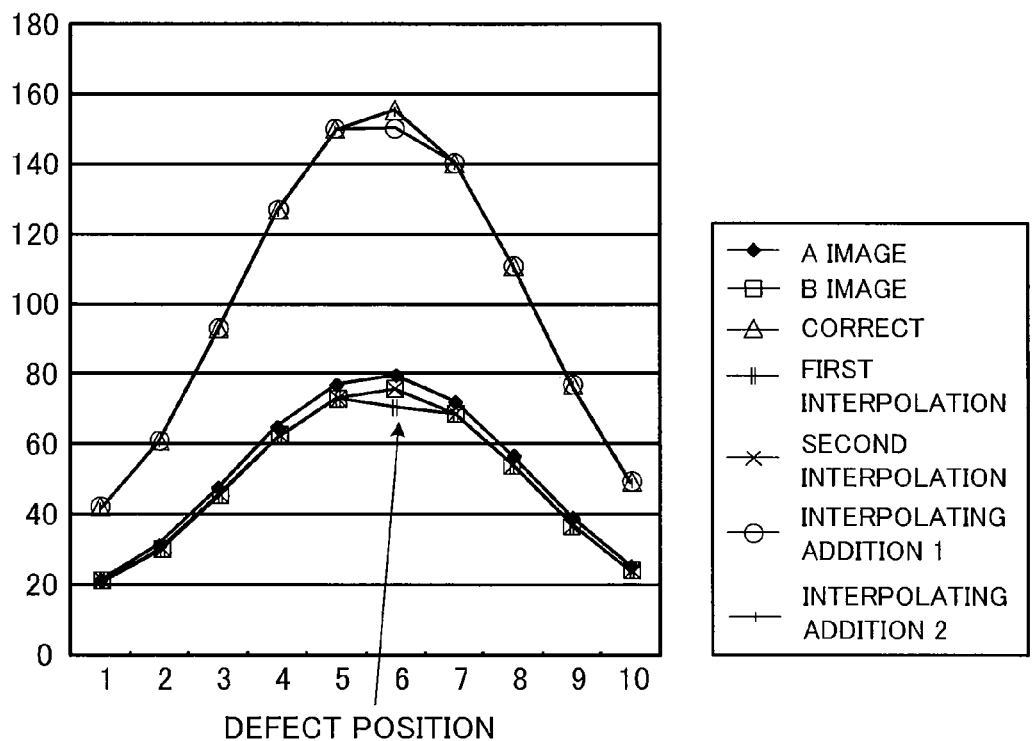

Subsequently, referring to FIGS. 12A and 12B, a problem that is caused by performing the interpolation of the first defect interpolation circuit 104 will be described. FIGS. 12A and 12B illustrate signals of the A image and the B image that are formed by the left light and the right light obtained by the pupil division respectively, and signals that are generated by adding these signals. FIG. 12A illustrates a case in which a high frequency component is not contained in the signals, and a unit that is indicated by an arrow is a unit where the interpolation has been performed by the first defect interpolation circuit 104. A position after the interpolation is overlapped with the original signal position, which means that this interpolation is appropriately performed. On the other hand, FIG. 12B illustrates a case in which the high frequency component is contained in the signals, and a unit after the interpolation, i.e. a unit that is indicated by an arrow, is not overlapped with the original signal position, which means that an error occurs. The results of the interpolations by the second defect interpolation circuit 107 are also illustrated in FIGS. 12A and 12B, and the interpolations are appropriately performed as illustrated in both FIGS. 12A and 12B.

Hereinafter, the interpolation method that is performed by the second defect interpolation circuit 107 will be described in detail in order from a principle. Images that are obtained based on the A image and the B image that are formed by performing the pupil division to the right and left have characteristics that the images substantially coincide with each other in an in-focus state, and that projected positions of the images are shifted to right and left in an out-of-focus state. A method of performing a focus detection using the characteristics is known. However, since the A image and the B image have shading characteristics that are different from each other even in the in-focus state, a slight difference of levels is generated. As the image gets away from the center of the lens, i.e. an image height gets higher, the difference of the levels is also increased.

Subsequently, referring to FIGS. 7A and 7B, a principle of the shading will be described in detail. FIG. 7A is a cross-sectional view of lenses, and a point x that is positioned at a center of the optical axis on an image pickup element 704 and a point y that is positioned at a higher image height are indicated by arrows. FIG. 7B illustrates a position relation of a frame that is projected when the lenses are viewed from the positions of the point x and the point y. In FIGS. 7A and 7B, reference numerals 701, 702, and 703 are frames that are formed by a lens at an object side, a stop, and a lens at the image pickup element 704, respectively. When viewed from the point x on the image pickup element 704, the frames 701, 702, and 703 are provided concentrically, and the shape in which light can pass is determined by the stop 702. When viewed from the point y on the image pickup element 704, the upper side is cut by the frame 703, the lower side is cut by the frame 701, and the side surface is cut by the frame 702. FIG. 7B illustrates a shape of the area in which the light that is cut by the three frames can pass. Generally, this shape is called a vignetting or a vignetting shape.

Figure 8:
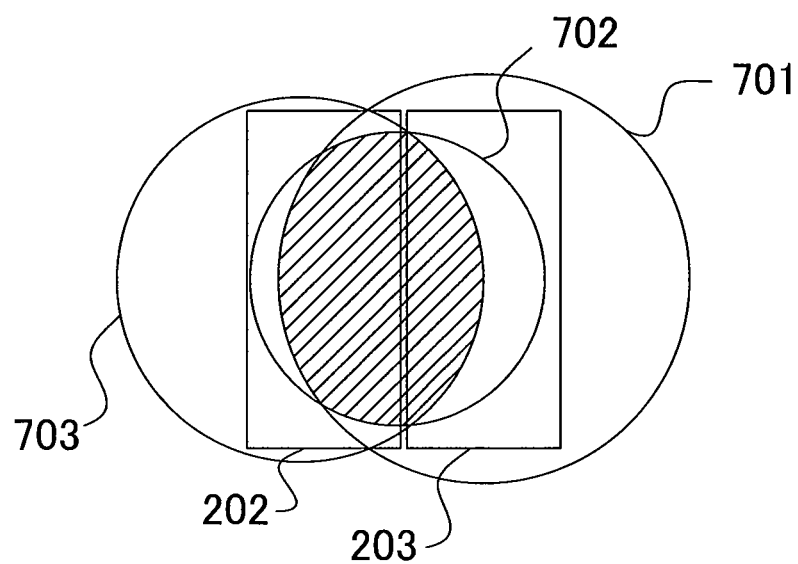
FIG. 8 is a diagram of describing a rate of an A pixel and a B pixel by the shading in Embodiment 1.

FIG. 8 is a diagram of describing a rate of the A pixel and the B pixel by the shading, which illustrates photo diodes that are obtained by performing the pupil division are overlapped with the vignetting shape. The light reaches the photo diodes only in a shaded area in FIG. 8. In the state illustrated in FIG. 8, the light reaches a large area of the photo diode 202 compared to an area of the photo diode 203. Therefore, even when the A image and the B image coincide with each other in the in-focus state, the difference of levels are generated due to the influence of the vignetting (the vignetting shape).

Figure 13:
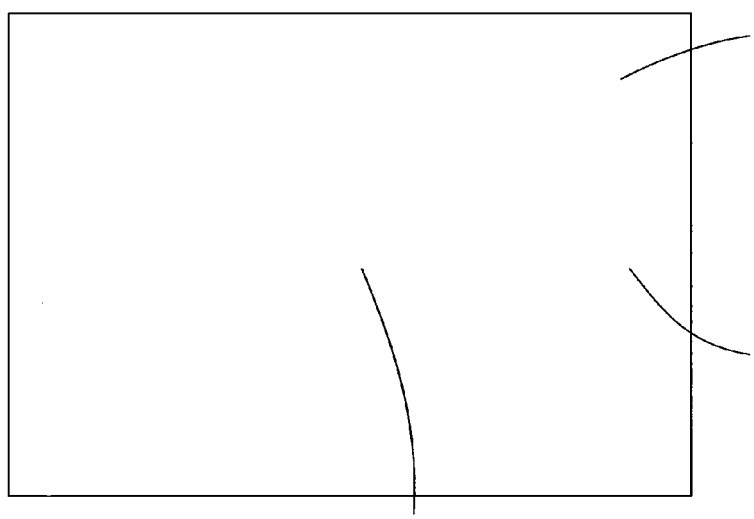
FIG. 13 is a diagram of a relationship between a position of a screen and a vignetting shape in Embodiment 1.
Figure 13:
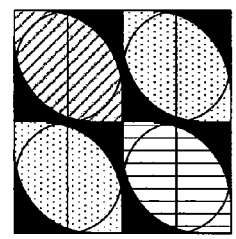
Figure 13:
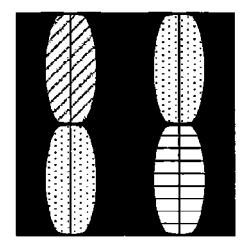
Figure 13:
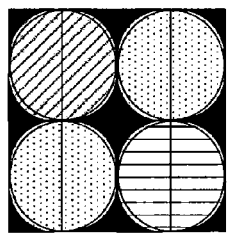

FIG. 13 is a diagram of the relation between a location on the image pickup element (a position on a screen) and the vignetting shape (a characteristic diagram). As the image height gets higher, the vignetting shape also gets distorted and the shape is different in accordance with the location. However, in any locations, the vignetting shapes of nearby pixels are closely similar to each other. In other words, although the difference of the levels of the photo diodes 202 and 203 is generated as illustrated in FIG. 8, the difference of the levels is generated with the same characteristics in the nearby pixels.

The second defect interpolation circuit 107 in the present embodiment uses the following two principles. First, the difference of the levels of the A pixel and the B pixel is generated dominantly by the vignetting shape because the A image and the B image are overlapped with each other to be the same image in the in-focus state. Second, the vignetting shapes of the nearby pixels are closely similar. Based on the two principles, in the present embodiment, a value of the defective pixel position is obtained as follows. In other words, a rate of pixel values (a level rate) of the A pixel and the B pixel that are the nearby pixels that are positioned near the defective pixel is multiplied by a pixel value at an opposed side of the same micro lens as that of the defective pixel to obtain a second interpolation value. Then, the first interpolation value and the second interpolation value are gently switched in accordance with the focal state (the in-focus level).

Figure 11:
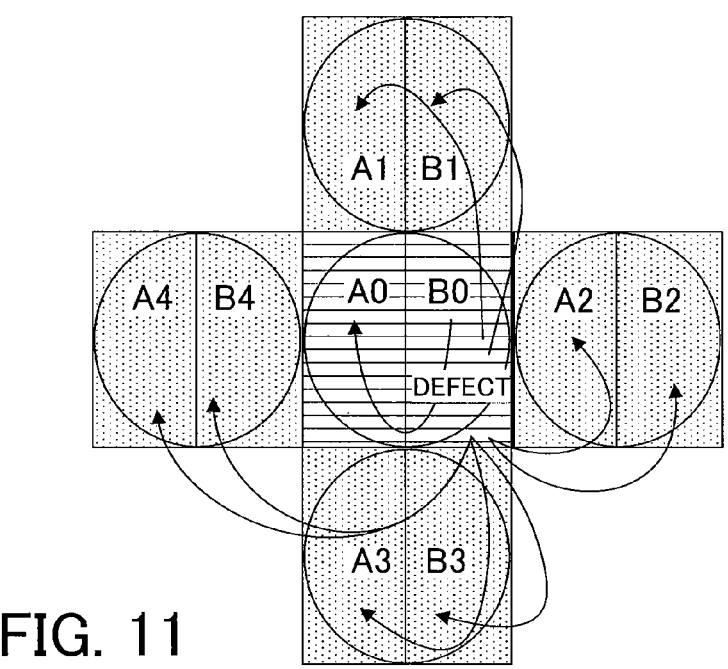
FIG. 11 is a diagram of relationship between the defective pixel and the reference pixel by the second defect interpolation circuit in Embodiment 1.

FIG. 11 is a diagram of a relationship between the defective pixel and the reference pixels by the second defect interpolation circuit 107. In FIG. 11, the defective pixel is assumed to be a pixel B0 (a specific second pixel). In this case, a rate of A pixels (A1 to A4) and B pixels (B1 to B4) of the micro lens that are positioned at the top, right, bottom, and left of the pixel B0 is obtained. Then, this rate is multiplied by a pixel A0 (a specific first pixel) at an opposed side of the same micro lens as that of the defective pixel (the pixel B0) to obtain an interpolation value of the defective pixel. Thus, the second defect interpolation circuit 107 interpolates the defective pixel using a pixel rate of the first pixel and the second pixel in the same micro lens near the specific first pixel and the specific second pixel. In other words, since an adjacent pixel is referred to as a reference pixel of the rate and a pixel in the same micro lens is referred to as a reference pixel of the value, a spatial distance between these pixels extremely close. The reference pixel is not limited to the adjacent pixel, but a pixel that is positioned near the defective pixel may also be used as the reference pixel.

On the other hand, as illustrated in FIG. 10, the first defect interpolation circuit 104 refers to a value of a pixel at a position where the spatial distance is away in order to refer to a pixel having the same color. Therefore, an error that is generated by the first defect interpolation circuit 104 is increased as the spatial frequency gets higher, and on the other hand, the second defect interpolation circuit 107 can perform an appropriate interpolation even when the spatial frequency is high.

Figure 4:
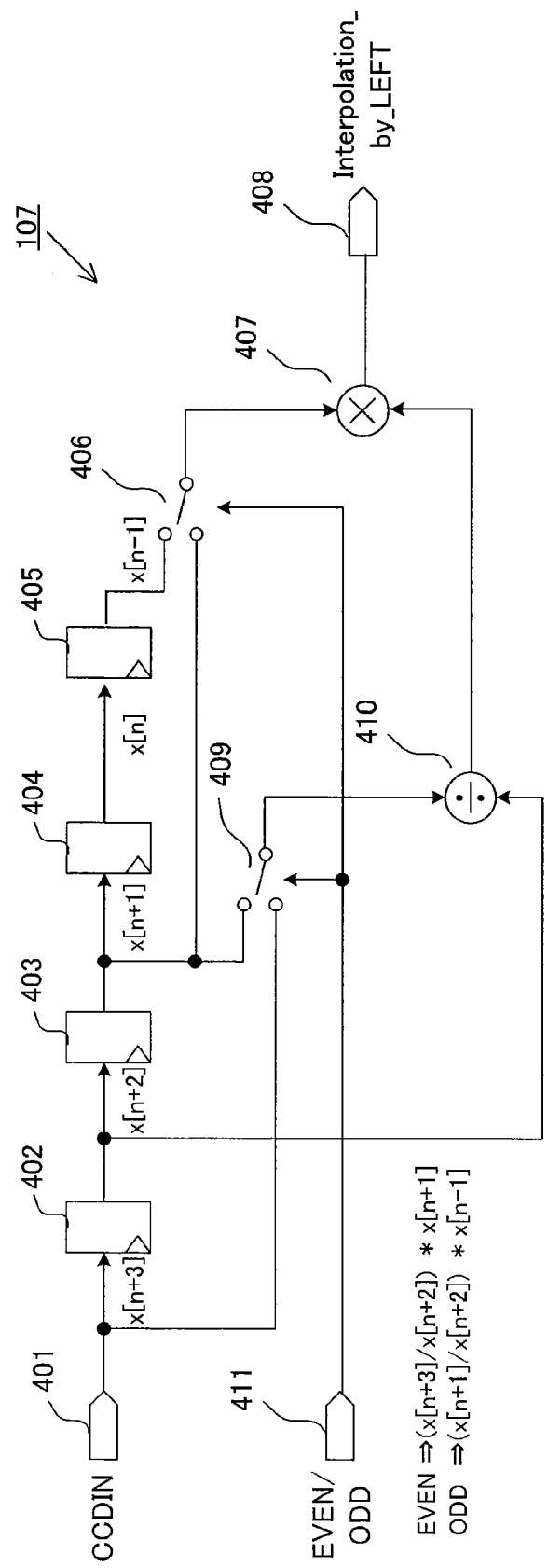
FIG. 4 is a sub-block diagram of a second defect interpolation circuit in Embodiment 1.

Next, the second defect interpolation circuit 107 will be described in detail. FIG. 4 is a sub-block diagram of the second defect interpolation circuit 107. In FIG. 4, reference numeral 401 denotes a terminal that is provided for inputting a signal from the first defect interpolation circuit 104, and reference numerals 402 to 405 denote delay elements that delay the input signal. Reference numeral 411 denotes a terminal that is provided for inputting a signal to differentiate a cycle of the A pixel and a cycle of the B pixel. The signal that is inputted from the terminal 411 operates by each cycle toggle. Reference numeral 408 denotes a terminal that is provided for outputting a signal as a calculation result.

The signal that is outputted to the terminal 408 is an interpolation signal that has a delay corresponding to an output timing that has a delay caused by the delay element 404. When the output timing of the delay element 404 is defined as x[n], the output timing of the delay element 405 can be given as x[n−1] and the output timing of the delay element 403 can be given as x[n+1]. Furthermore, the output timing of the delay element 402 is given as x[n+2], and the timing of the input signal from the terminal 401 is given as x[n+3]. This circuit outputs a reference value with respect to the terminal 408 for each cycle. Both of switches 406 and 409 are switched by the input signal from the terminal 411, and both of inputs to a divider 410 and a multiplier 407 are switched. As a result, an arithmetic expression of the signal that is outputted to the terminal 408 is switched in accordance with whether a cycle in which the input signal from the terminal 411 is 1 or a cycle in which the input signal is 0. When the cycle in which the input signal from the terminal 411 is 1 is defined as ODD and the cycle in which the input signal is 1 is defined as EVEN, the arithmetic expression is represented as follows.

EVEN: REFERENCE VALUE $x[n]=(x[n+2]/x[n+3])$
$*x[n+1]$

ODD: REFERENCE VALUE $x[n]=(x[n+1]/x[n+3])*x[n-1]$

Figure 14:
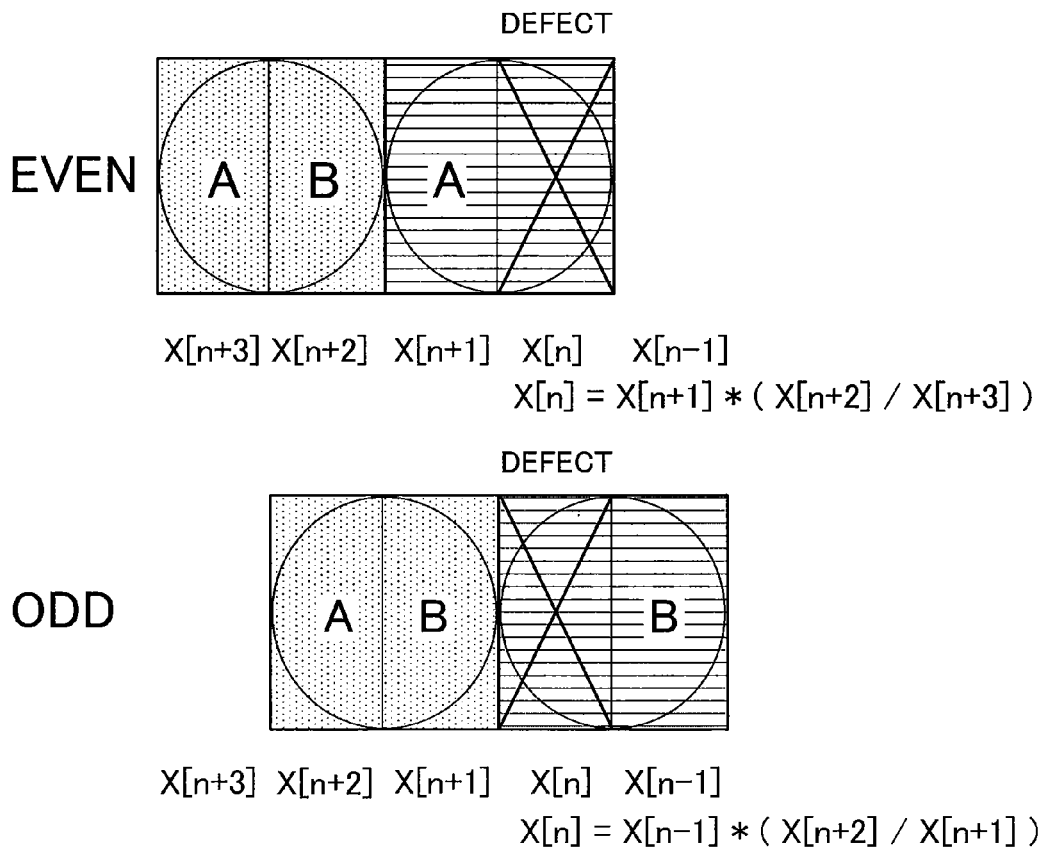
FIG. 14 is a diagram of a relationship between the second defect interpolation circuit and a pixel position in Embodiment 1.

Referring to FIG. 14, the relationship between the above arithmetic expression and the pixel position will be described. At the timing of EVEN, x[n] is the B pixel, the corresponding A pixel is x[ n+1], the adjacent A pixel is x[x+3], and the B pixel is x[n+2]. On the other hand, at the timing of ODD, x[n] is the A pixel, and the corresponding B pixel is x[n−1]. The adjacent A pixel is x[n+2], and the B pixel is x[n+1]. Thus, a circuit 2005 is configured so that the arithmetic expression is changed by one cycle since the A pixel and the B pixel are alternately arranged. Providing only the circuit illustrated in FIG. 4 functions as the present embodiment, but the circuit may be influenced if the adjacent pixel has a low brightness or a lot of noises are generated. Therefore, an average value of values that are calculated from the right, left, top, and bottom of the pixel in a latter circuit is used in the present embodiment.

FIG. 6 is a block diagram of an averaging circuit in the second defect interpolation circuit 107. Signals that are inputted to four terminals 601 to 604 are signals for which the interpolation has been performed using rates of the left, right, top, and bottom pixels (interpolation results), respectively. These signals are added by adders 605, 606, and 607, and then are averaged by a shift circuit 608 to be outputted to a terminal 609. The circuit illustrated in FIG. 4 is a circuit that is connected with the terminal 601, and the pixel at the left side is referred to as a reference pixel of the rate. The circuits that are connected with the terminals 602 to 604 are the same as the circuit of FIG. 4 except for referring to pixels at right, up, and down side, respectively.

Figure 15:
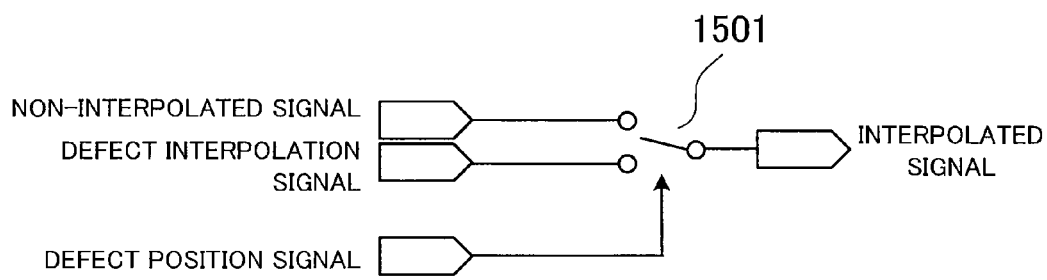
FIG. 15 is a block diagram of a switching circuit in Embodiment 1.

As described above, the second defect interpolation circuit 107 is described with reference to FIGS. 4 and 6, and the first defect interpolation circuit 104 is described with reference to FIG. 5, and both the circuits calculate interpolation values for all cycles. In the present embodiment, a switching circuit that is illustrated in FIG. 15 is inserted behind both the first defect interpolation circuit 104 and the second defect interpolation circuit 107. This switching circuit switches a signal before the interpolation (a non-interpolated signal) and a signal after the interpolation (an interpolated signal) by a switch 1501 in accordance with a defect position signal from a defect position storing memory 105 to output a defect interpolation signal. This switching circuit outputs the signal before the interpolation with respect to positions except for positions that are stored as defect positions in the defect position storing memory 105, and the interpolation value is replaced only for the defect position.

Figure 9:
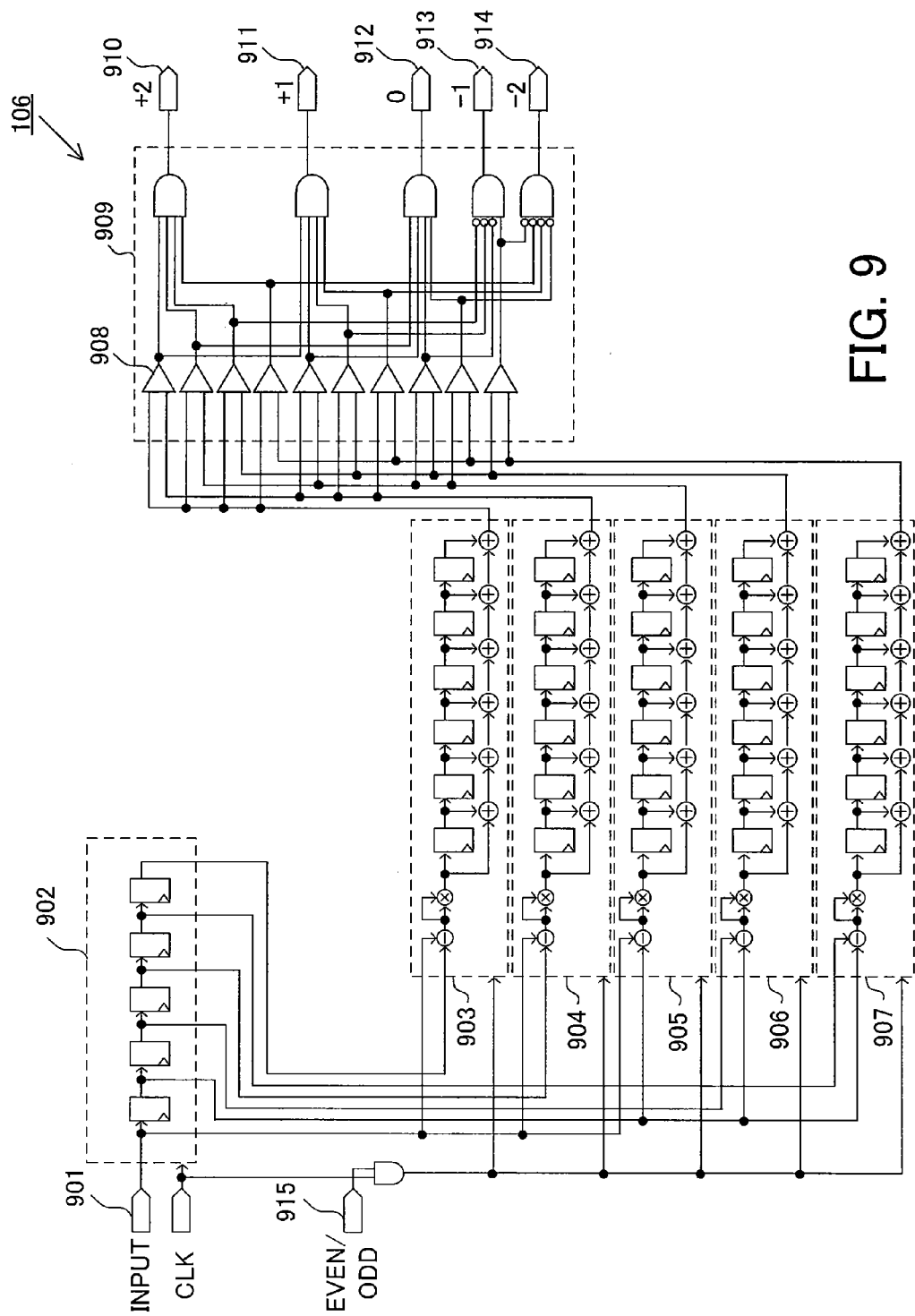
FIG. 9 is a circuit diagram of an in-focus level evaluation unit in Embodiment 1.

Next, referring to FIG. 9, a circuit configuration of the in-focus level evaluation unit 106 will be described. FIG. 9 is a circuit diagram of the in-focus level evaluation unit 106, which is depicted so as to include circuits whose number is smaller than it really is for easy explanation. The in-focus level evaluation unit 106 evaluates an in-focus level (a focal state) using a plurality of first pixels (A pixels) and a plurality of second pixels (B pixels). In FIG. 9, a signal that is inputted to a terminal 901 is an output of the first defect interpolation circuit 104. Reference numeral 902 denotes a delay element array that refers to pixels that are located at different positions with the same cycle. In the present embodiment, six pixels adjacent to each other are picked up at the same time. A clock that is provided to delay elements 903 to 907 with respect to the delay element array 902 is changed to half by the gate of the EVEN/ODD signal that is inputted from a terminal 915, and a one-cycle processing is performed by inputting the two pixels of the A pixel and the B pixel apparently. The delay elements 903 to 907 have the same circuit configuration each other except that the inputted two pixel positions are different. A signal that is obtained by squaring the difference of the two pixel values to make an addition of seven cycles is inputted from the delay circuit 903 to 907.

This circuit calculates a correlation amount using an SSD (Sum of Squared Difference) calculation method. The input of the delay element 905 corresponds to the A pixel and the B pixel having the same micro lens (a common micro lens). On the other hand, the input of the delay element 904 corresponds to the B pixel of the micro lens that is adjacent to that of the A pixel, the input of the delay element 903 corresponds to the B pixel of the micro lens that is the next but one, and a signal of the A pixel shifted from the same B pixel as the delay element 905 is inputted to the delay elements 906 and 907. Since the delay elements 903 to 907 are provided, a correlation amount where the A image and the B image indicate a degree of coincidence in a range of a shift amount of ±2. In the SSD calculation method, the evaluation value is decreased as the degree of coincidence is improved. Reference numeral 909 denotes a circuit in which one bit that corresponds to a shift having a low evaluation value and a high degree of coincidence indicates 1 and the other bits indicate 0. Reference numeral 908 denotes a comparator that compares two input signals to output 1 if the result is as expected and to output 0 if not. When the combination is the same as expected at the latter logic circuit, it outputs 1. If it is an in-focus unit, an output (a terminal 9012) that indicates the shift amount of 0 is 1. On the other hand, if the in-focus level is decreased, outputs (outputs of terminals 910, 911, 913, and 914) that correspond to locations where the shift amount are large are 1.

In FIG. 9, for easy explanation, the delay amount at the delay element array 902 is set to 6 and the accumulation width at the delay elements 903 to 907 is set to 7, which correspond to the shift amount and the evaluation width of the degree of coincidence respectively. As a shift amount, a width that is capable of covering the maximum shift amount that depends on a base-line length and the maximum defocus amount of the A image and the B image that are determined by optical characteristics of lenses is necessary. The result of the in-focus level evaluation unit 106 is read by a micro computer 113 and is also used for performing the autofocus. Furthermore, the output of the in-focus level evaluation unit 106 is inputted to a mixing circuit 109.

The mixing circuit 109 gently switches a synthesis rate of the output of the first defect interpolation circuit 104 and the output of the second defect interpolation circuit 107 in accordance with the in-focus level (the in-focus state) that is determined by the in-focus level evaluation unit 106. Specifically, as the in-focus level that is an output of the in-focus level evaluation unit 106 is improved, the rate of the output of the second defect interpolation circuit 107 is increased. On the other hand, as the in-focus level is lowered, the rate of the output of the first defect interpolation circuit 104 is increased. A synchronous delay circuit 112 is a delay circuit that matches timings of the output of the first defect interpolation circuit 104 and the output of the second defect interpolation circuit 107.

In the present embodiment, the in-focus level is represented as a defocus amount (a length between a focal plane and an image plane). In a phase difference method, the defocus amount is obtained by multiplying an image shift amount by K value that is determined by the base-line length. The in-focus level is the maximum (the in-focus state) when the image shift amount (the defocus amount) is zero, and as the synthesis rate at the mixing circuit 109, the output of the second defect interpolation circuit 107 is set to 100%. Then, as the image shift amount is increased, the in-focus level is decreased and the state is changed to the out-of-focus state when the image shift amount (the defocus amount) is greater than or equal to a predetermined amount. Furthermore, as the synthesis rate at the mixing circuit 109, the output of the first defect interpolation circuit 104 is set to 100%. The synthesis rate at the mixing circuit 109 can be changed linearly. However, in order to suppress the amplification of a noise component an area where one output starts to mix with the other output (in the vicinity of 0%/100% of each output), the synthesis rate may also be changed so that a part or whole of the synthesis rate is curved.

The defocus amount can also be calculated using a contrast method, and focus detection accuracy is improved by the hybrid of the phase difference method and the contrast method. In this case, the in-focus level is the maximum (the in-focus state) when the value that is obtained by dividing the defocus amount by the K value is equal to zero, and as the synthesis rate in the mixing circuit 109, the output of the second defect interpolation circuit 107 is set to 100%. The in-focus level is lowered as the value that is obtained by dividing the defocus amount by the K value is enlarged, and the state is changed to the out-of-focus state when the value is as large as a predetermined value. In this case, as the synthesis rate in the mixing circuit 109, the output of the first defect interpolation circuit 104 is set to 100%.

Thus, the mixing circuit 109 gently switches the synthesis rate of the output of the first defect interpolation circuit 104 and the second defect interpolation circuit 107. Specifically, the mixing circuit 109 increases the rate of the output of the second defect interpolation circuit 107 as the in-focus level that is evaluated by the in-focus level evaluation unit 106 is increased, and on the other hand it increases the rate of the output of the first defect interpolation circuit 104 as the in-focus level is decreased.

An index at the object side is included in the depth of field (it is logarithm for the defocus amount of the image plane). Accordingly, the depth of field is obtained by considering an object distance as well as a stop value. In this case, it is preferred that the switching to the output of the second defect interpolation circuit 107 cannot be easily performed, i.e. the rate of the output of the second defect interpolation circuit 107 is decreased, when the depth of field is shallow. On the other hand, the switching of the output of the second defect interpolation circuit 107 can easily performed, i.e. the rate of the output of the second defect interpolation circuit 107 is increased, when the depth of field is deep. In other words, it is preferred that the synthesis rate be switched so that the mixing circuit 109 increases the rate of the output of the first defect interpolation circuit 104 as the depth of field gets shallow and that it increases the rate of the output of the second defect interpolation circuit 107 as the depth of field gets deeper.

The output of the mixing circuit 109 that outputs the signal generated by the synthesis rate in accordance with the in-focus level is added with the A pixel and the B pixel by the Bayer addition circuit 110 to be sent to a video signal processing circuit 111. The micro computer 108 reads the output of the in-focus level evaluation unit 106 to be used for the focus detection. The present embodiment is a technology related to a defect interpolation, and therefore the detailed descriptions of the operation of the micro computer 108 and the focus detection are omitted.

As described above, in the present embodiment, the two photo diodes are disposed for one micro lens to perform the pupil division. The synthesis rate of the output of the first defect interpolation circuit that obtains the interpolation value using the nearby pixel values of the same color and the same pupil and the output of the second defect interpolation circuit that uses the rate of the pixel values in the same nearby micro lens are gently switched in accordance with the in-focus level.

Embodiment 2

Figure 16:
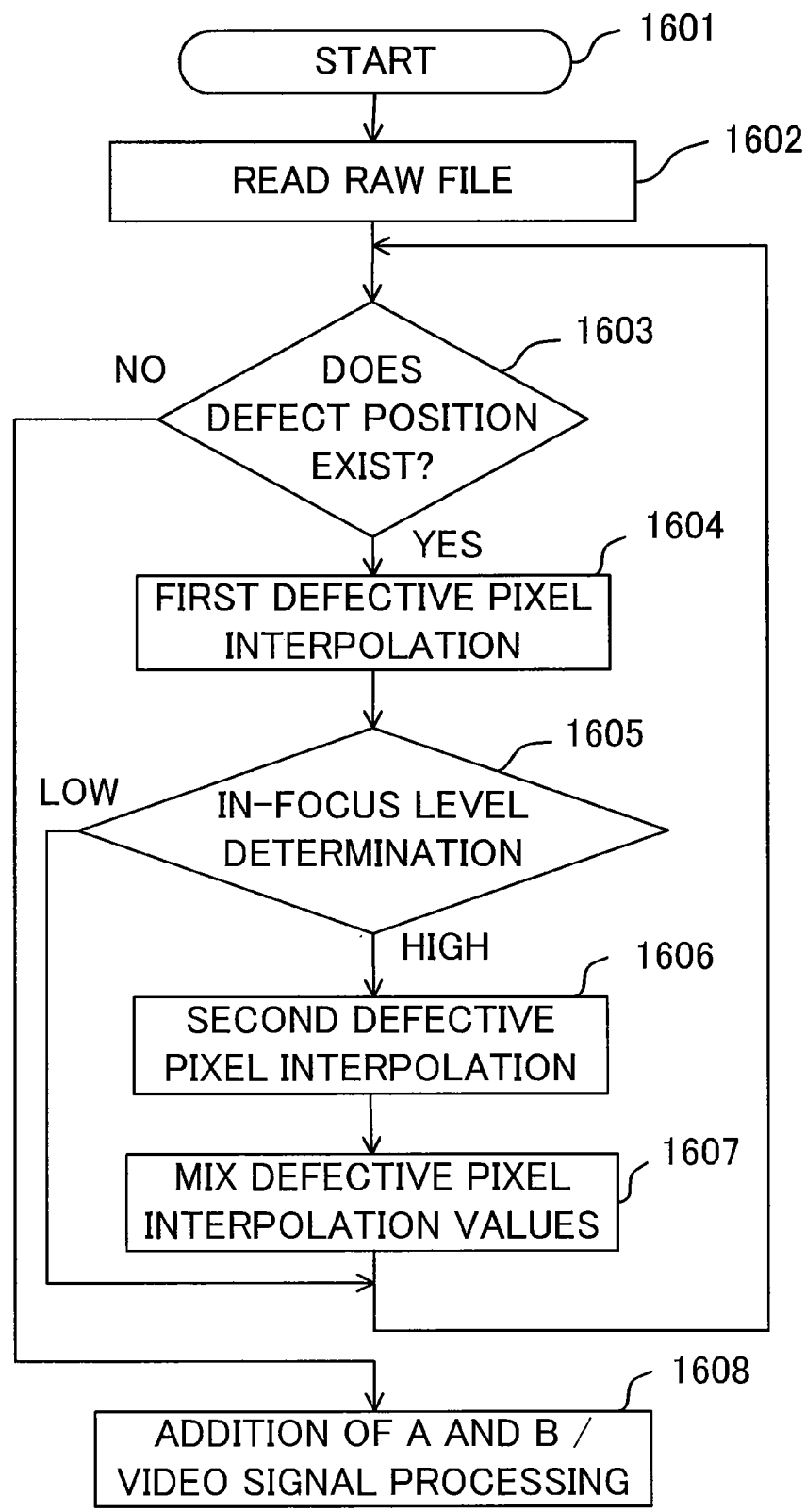
FIG. 16 is a flowchart of an image processing method in Embodiment 2.

Next, referring to FIG. 16, Embodiment 2 of the present invention will be described. FIG. 16 is a flowchart of an image processing method in the present embodiment. In a recent digital camera, there is a method of storing an original output of an image pickup element as a file during taking an image to perform a signal processing (an image processing) using a software such as a personal computer or the like afterwards. The software that performs such a processing is called a RAW development software. The image processing is performed by an image processing circuit that is embedded in an image pickup apparatus in Embodiment 1, and on the other hand the image processing is performed by the RAW development software in the present embodiment. Each step in the flowchart of FIG. 16 is performed based on an instruction of a CPU (a micro computer) such as a personal computer.

In FIG. 16, first of all, the process starts in Step S1601, and then a RAW file is loaded in Step S1602. A value as a pixel value of a defective pixel is set to zero and it is stored in the RAW file. The value that indicates the defective pixel position is called a defective mark. Subsequently, in Step S1603, the defective mark (the defective position) is searched. When the defective mark does not exist, the flow proceeds to Step S1608. On the other hand, when the defective mark exists, the flow proceeds to Step S1604 in order to perform a processing that corresponds to the defective pixel.

When the defective mark exists, in Step S1604, a first defective pixel interpolation is performed (a first defect interpolation step). The first defective pixel interpolation corresponds to the function of the first defect interpolation circuit 104 of Embodiment 1, and for example as illustrated in FIG. 10, it is performed by using left, right, top, and bottom pixel values having the same color and the same pupil. Subsequently, in Step S1605, the in-focus level is determined (the in-focus level evaluation step). The in-focus level determination in this time corresponds to the function of the in-focus level evaluation unit 106 in Embodiment 1. When the in-focus level is higher than a predetermined threshold value in Step S1605, the flow proceeds to Step S1606. On the other hand, when the in-focus level is lower than the predetermined threshold value, the flow returns to Step S1603.

When the in-focus level is higher than the predetermined threshold value in Step S1605, a second defective pixel interpolation is performed in Step S1606 (a second defect interpolation step). The second defective pixel interpolation corresponds to a function of the second defect interpolation circuit 107 of Embodiment 1. Therefore, in Step S1606, as illustrated in FIG. 11, a pixel value rate of nearby pixels in the same micro lens is obtained, and the rate is multiplied by a pixel value that faces the defective pixel to obtain an interpolation value. Subsequently, in Step S1607, using a synthesis rate in accordance with the in-focus level that is calculated in Step S1605, the interpolation value calculated in Step S1604 is mixed with the interpolation value calculated in Step S1606 (a synthesis rate switching step). In Embodiment 1, the shift amounts of the A image and the B image that coincide with each other are calculated by a pixel unit as the in-focus level. On the other hand, in the present embodiment, the calculation is performed up to a sub-pixel unit using a parabola fitting method to gently control a mix rate.

Since the defective mark (the defective position) is replaced with the interpolation value in Step S1604, the existence of the defective mark at the position (the existence of the defective position) is not detected in performing Step S1603 subsequently. Steps S1603 to S1607 are repeated so that all the defective marks are replaced with the interpolation values. When there is no defective mark, the flow proceeds to Step S1608. In Step S1608, the A pixel are added to the B pixel to perform a common signal processing, and the RAW file is converted into an image file (a signal processing step). Since the detail of the signal processing is not relevant to a nature of the present embodiment, the description in the embodiment is omitted.

Embodiment 3

Figure 17:
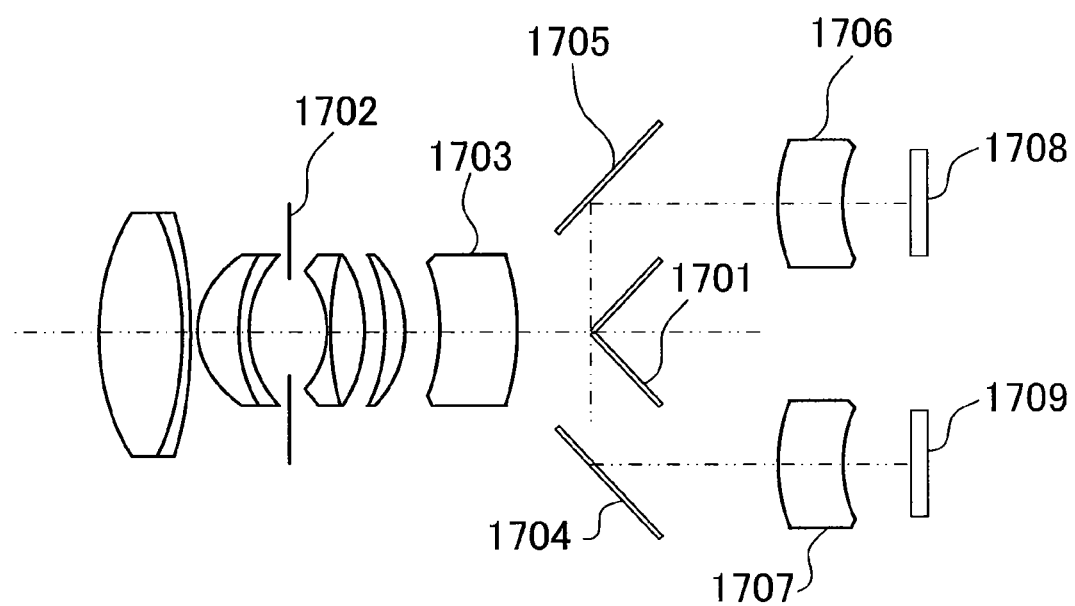
FIG. 17 is a diagram of an optical structure of a system in Embodiment 3.

Next, referring to FIG. 17, Embodiment 3 of the present invention will be described. FIG. 17 is a diagram of an optical structure of a system that separates incident light into right and left images at the same time in a parallel light area (an area where light expanded from a point light source at a focal position at an object side) in a relay lens to perform an exposure of an A image and a B image using image pickup elements different from each other. Reference numeral 1701 denotes a mirror, reference numeral 1702 denotes a stop, and reference numeral 1703 denotes a relay lens. The light that is formed so as to be parallel by the relay lens 1703 is divided into right and left sides by the mirror 1701. The lights divided by the mirror 1701 are reflected on mirrors 1705 and 1704, respectively. The reflected lights are introduced to image-forming lenses 1706 and 1707 to be formed on image pickup elements 1708 and 1709, respectively. As a result, the A image and the B image can be obtained by the two image pickup element at the same time. In the present embodiment, the exposure of the A image and the B image may also be performed by time division. Even in the configuration described above, the technology of interpolating the defective pixel that is described in each embodiment above can be applied.

According to each embodiment described above, in processing the image pickup signal that is obtained by the pupil division, an image processing apparatus and an image processing method that are appropriately interpolate a defective pixel even when the sharpness is high can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in Embodiments 1 and 2, an example in which the pupil division is performed by a plurality of photo diodes for one micro lens is described, but the similar effect can also be obtained using a signal that is obtained by shielding light between the micro lens and the photo diode to perform the pupil division if it is a signal that is obtained by the pupil division. In Embodiments 1 and 2, an image that is obtained by a single-plate image pickup element is assumed, but each embodiment can also be applied to a two-plate or three-plate image pickup element. In this case, the pupil division does not have to be performed between the micro lens and the photo diode. In Embodiments 1 and 2, the in-focus level is calculated based on the degree of coincidence of the image that is obtained by the pupil division, but the in-focus level may also be calculated by the contrast method or by the hybrid with the contrast method.

This application claims the benefit of Japanese Patent Application No. 2010-285347, filed on Dec. 22, 2010, which is hereby incorporated by reference herein in its entirety.

What is claimed is:

1. An image processing apparatus that performs a pupil division of a light beam from an image pickup optical system to obtain a first light beam and a second light beam, and processes an image that is obtained by using an image pickup element that includes a plurality of first pixels that perform a photoelectric conversion of the first light beam and a plurality of second pixels that perform a photoelectric conversion of the second light beam, the image processing apparatus comprising:
   a first defect interpolation unit configured to interpolate a defective pixel using a pixel value of a first pixel near a specific first pixel when the specific first pixel is the defective pixel or using a pixel value of a second pixel near a specific second pixel when the specific second pixel is the defective pixel;
   a second defect interpolation unit configured to interpolate the defective pixel using a rate of pixel values of a first pixel and a second pixel in a same micro lens near the specific first pixel and the specific second pixel;
   an in-focus level evaluation unit configured to evaluate an in-focus level using outputs of the plurality of first pixels and the plurality of second pixels;
   a synthesis rate switching unit configured to switch a synthesis rate of an output of the first defect interpolation unit and an output of the second defect interpolation unit so that the rate of the output of the second defect interpolation unit increases as the in-focus level that is evaluated by the in-focus level evaluation unit is heightened and the rate of the output of the first defect interpolation unit increases as the in-focus level is lowered; and
   a signal processing unit configured to generate a shot image using an output of the synthesis rate switching unit.

2. The image processing apparatus according to claim 1, wherein the in-focus level is a defocus amount, and
   wherein the synthesis rate switching unit switches the synthesis rate so that the output of the second defect interpolation unit is set to 100% when the defocus amount is zero, and the output of the first defect interpolation unit is set to 100% when the defocus amount is at least a predetermined value.

3. The image processing apparatus according to claim 1, wherein the synthesis rate switching unit switches the synthesis rate of the output of the first defect interpolation unit and the output of the second defect interpolation unit so that a rate of the first defect interpolation unit increases as a depth of field gets shallow and a rate of the second defect interpolation unit increases as the depth of field gets deeper.

4. The image processing apparatus according to claim 1, wherein the in-focus level evaluation unit evaluates the in-focus level using a phase difference between the first light beam and the second light beam that are obtained by the pupil division.

5. The image processing apparatus according to claim 1, wherein the in-focus level evaluation unit evaluates the in-focus level using the output of the first defect interpolation unit.

6. An image processing method that performs a pupil division of a light beam from an image pickup optical system to obtain a first light beam and a second light beam, and processes an image that is obtained by using an image pickup element that includes a plurality of first pixels that perform a photoelectric conversion of the first light beam and a plurality of second pixels that perform a photoelectric conversion of the second light beam, the image processing method comprising:
   a first defect interpolation step that interpolates a defective pixel using a pixel value of a first pixel near a specific first pixel when the specific first pixel is the defective pixel or using a pixel value of a second pixel near a specific second pixel when the specific second pixel is the defective pixel;
   an in-focus level evaluation step that evaluates an in-focus level using outputs of the plurality of first pixels and the plurality of second pixels;
   a second defect interpolation step that interpolates the defective pixel using a rate of pixel values of a first pixel and a second pixel in a same micro lens near the specific first pixel and the specific second pixel;
   a synthesis rate switching step that switches a synthesis rate of an output in the first defect interpolation step and an output of the second defect interpolation step so that the rate of the output of the second defect interpolation step increases as the in-focus level that is evaluated by the in-focus level evaluation step is heightened and the rate of the output of the first defect interpolation step increases as the in-focus level is lowered; and
   a signal processing step that generates a shot image using an output that is obtained by the synthesis rate switching step.

* * * * *